United States Patent [19]

Sharma et al.

[11] 3,844,842
[45] Oct. 29, 1974

[54] INSULATING SEAL FOR MOLTEN SALT BATTERY

[75] Inventors: Ram A. Sharma, Sterling Heights; James F. Rhodes, Warren, both of Mich.

[73] Assignee: General Motors Corporation, Detroit, Mich.

[22] Filed: Nov. 28, 1972

[21] Appl. No.: 309,961

[52] U.S. Cl. ............................ 136/133, 136/83 T
[51] Int. Cl. ............................................ H01m 1/02
[58] Field of Search ........ 136/86 F, 133, 153, 83 T, 136/61 F

[56] References Cited
UNITED STATES PATENTS

| | | | |
|---|---|---|---|
| 2,927,951 | 3/1960 | Lindstrom | 136/153 |
| 3,120,456 | 2/1964 | Broers | 136/153 |
| 3,528,856 | 9/1970 | Ovshinsky | 136/83 T |
| 3,723,186 | 3/1973 | Borucka et al. | 136/153 |

Primary Examiner—Winston A. Douglas
Assistant Examiner—H. A. Feeley
Attorney, Agent, or Firm—Lawrence B. Plant

[57] ABSTRACT

An inter-electrode insulating seal comprising lithium fluoride and a low thermal expansion filler for use in high temperature batteries having lithium fluoride-saturated molten salt electrolytes. The filler mitigates the affects of lithium fluoride's thermal expansion.

1 Claim, 3 Drawing Figures

INSULATING SEAL FOR MOLTEN SALT BATTERY

BACKGROUND OF THE INVENTION

This invention relates to insulating seals for molten salt electrochemical cells having highly reactive ingredients forming their electrochemical couples and is a variation of the seal disclosed and claimed in copending U.S. Pat. Ser. No. 309,959, filed Nov. 28, 1972 in the name of Ram A. Sharma and assigned to the assignee of the present invention. The aforesaid application is intended to be herein incorporated by reference.

Molten salt electrolyte galvanic cells having anode and cathode materials electrochemically coupled from opposite ends of the periodic table have excellent potential as high energy and high power portable sources of electricity. Included among such cells are those having anodic materials taken from the group I-A light metals (e.g., Li and Na) and cathodic materials taken from the group VI-A and group VII-A non-metals (e.g., S and $Cl_2$).

Among the problems of high temperature cells, such as the above, is compatibility between the several materials from which a cell is constructed. The materials must be joinable to each other to form and maintain hermetic joints over broad temperature ranges and under thermal cycling conditions. Moreover materials selection is further hampered by the fact that the highly reactive, corrosive, nature of the cell reactants create a chemical incompatibility between the reactants and most construction materials. The above problems are particularly acute where electrolyte-contacting insulating seals are needed to hermetically seal the cell and electrically isolate the cell's electrodes. An insulating seal material is needed which has thermal compatibility with the other cell construction materials and chemical compatibility with both extremes of the periodic table. The material selected must be strong, electrically non-conductive and have thermal expansion properties compatible with the other materials of construction. In the case of a $Li-Cl_2$ cell, for example, these other materials would typically comprise stainless steel and carbon or graphite. Considering the possible candidates for a seal material, one finds that some metal oxides are not attacked by chlorine but taken alone become conductive or degrade in the presence of lithium chloride containing dissolved lithium. One further finds that aluminum nitride is fine in the presence of lithium chloride containing dissolved lithium, but is vulnerable to chlorine attack. Metals and carbon do not have the requisite insulating properties. Similar problems are encountered in the other highly reactive electrochemical cells, e.g., the lithium-sulfur cell.

Experienced workers in the art have been frustrated to find that materials which resist the chemical environment are usually not good insulators and/or have poor thermal compatibility and conversely materials which are good insulators and have acceptable thermal compatibilities are not resistant to the chemical environment. Some have suggested locally freezing some of the cell's electrolyte to form an insulating seal, but this requires complex cooling equipment and wastes system energy. Other workers have resorted to complex seal and conductor arrangements such as disclosed in U.S. Pat. Craig No. 3,575,720, issued Apr. 20, 1971.

It is an object of this invention to provide an electrically insulating seal which is chemically compatible with highly reactive/corrosive cell reactants and is thermally compatible with the other cell construction materials. This and other objects and advantages of this invention will become more apparent from the detailed discussion which follows in which.

According to the present invention, an insulating seal comprises lithium fluoride and a filler therefor for mitigating the thermal expansion of the lithium fluoride. The filler is selected from a group of materials which are inert to most cell reactants and have low thermal expansion. Hence, compounds such as lanthanum oxide, yttrium oxide, aluminum nitride, calcium zirconate and lithium aluminate are considered useful for this purpose. The seal is used in a fused salt electrolyte cell in which the electrolyte is saturated with lithium fluoride to maintain the integrity of the seal against dissolution into the cell's electrolyte. In a preferred embodiment, the lithium fluoride-filler mixture is molded in situ between the electrodes to be joined. Particles of lithium fluoride and filler are mixed in the desired proportion, placed between the electrodes, and finally pressed and heated to above the melting point of the lithium fluoride for a time sufficient for the mixture to reach its maximum density.

The use of varying amounts of low thermal expansion fillers with lithium fluoride gives a considerable amount of flexibility to the cell designer in tailoring the thermal expansion properties of the seal to precisely meet his needs. The lithium fluoride-filler mix is preferably pressed and heated to above the fusion temperature of lithium fluoride to fuse the lithium fluoride and force it to flow into the interstices between the filler particles. Upon cooling the lithium fluoride solidifes as a matrix/binder for the filler. Seals thusly produced have thermal expansions substantially less than that of fused lithium fluoride without a filler. As much as 85 weight percent filler is possible. For a given cell, a low thermal expansion filler is selected according to its degree of inertness to that cell's reactants. In particular, the filler selected should resist a reaction which forms a salt which, coupled with lithium fluoride, produces a binary salt mixture having a melting point lower than the operating temperature of the cell.

As pointed out in the aforesaid application Ser. No. 309,959, an important consideration with the use of lithium fluoride insulating seals is to insure against its dissolution into the fused salt electrolyte upon contact therewith. According to one aspect of the invention in that application, the integrity of the lithium fluoride seal is maintained by saturating the electrolyte with lithium fluoride thereby establishing an equilibrium condition between the seal and the electrolyte which prevents dissolution of the lithium fluoride. In the event a cell should overheat to a point where the electrolyte is no longer saturated with lithium fluoride, some of the lithium fluoride seal surface will dissolve to reestablish the equilibrium condition. In the alternative, an extra amount of lithium fluoride (i.e., beyond saturation) is provided in the electrolyte to insure that a non-saturated condition does not occur.

Figure 1:
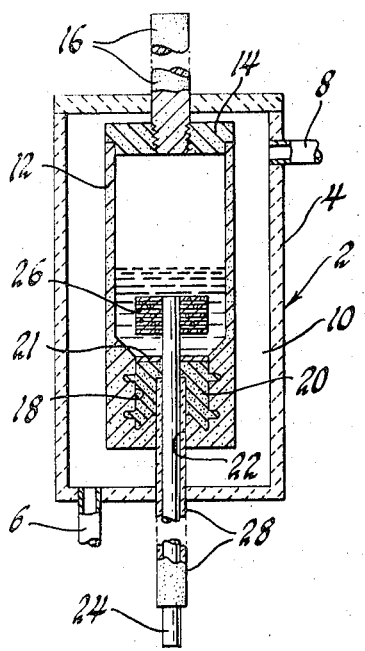
FIG. 1 is a sectioned side elevational view through a $Li-Cl_2$ fused salt cell utilizing the seal of the present invention.

More specifically and with reference to the drawings, FIG. 1 shows a Li-Cl$_2$ cell 2 comprising a quartz housing 4 having a chlorine inlet 6 and outlet 8. A chlorine atmosphere is maintained in the region 10 by flowing chlorine gas through the cell. The cell's electrodes and electrolyte are arranged in the region 10. A cylinder 12 of porous graphite is the chlorine electrode and also holds the lithium fluoride saturated electrolyte (e.g., LiCl or LiCl-KCl). The top of the cylinder 12 has a dense graphite cap 14 for closing off the cylinder. A graphite stud 16 extends from the cap 14 out of the housing 4 and is the external electrical lead from the chlorine electrode 12. A well 18 is provided at the bottom of the cylinder 12 to receive and contain the lithium fluoride-filler seal 20. A protective layer on cap 21 of pure lithium fluoride may be used with some lithium fluoride-filler mixtures to further isolate the lithium fluoride-filler mix from direct contact with the cell reactants. When used, such a protective layer can be placed at a number of locations on or around the lithium fluoride-filler mixture as considered desirable. The precise form or location of the layer will, of course, vary according to the needs of a particular cell design and the filler used. A bore 22 extends through the bottom of the cylinder 12 and into the well 18 and is adapted to receive a stainless steel rod 24 which is the electrical lead to the lithium electrode 26. A ceramic sheath 28 of impervious Al$_2$O$_3$ surrounds the rod 24 and protects it from the chlorine in region 10, and electrically insulates it from the bottom of the cylinder 12. A lithium storage electrode 26 is coupled to the rod 24 and positioned in the electrolyte as shown. The electrode 26 is preferably of the porous metal matrix type for holding liquid lithium within its interstices by capillary action. One such electrode is disclosed in Craig U.S. Pat. No. 3,560,265, issued Feb. 2, 1971, and assigned to the assignee of the present invention.

Figure 2:
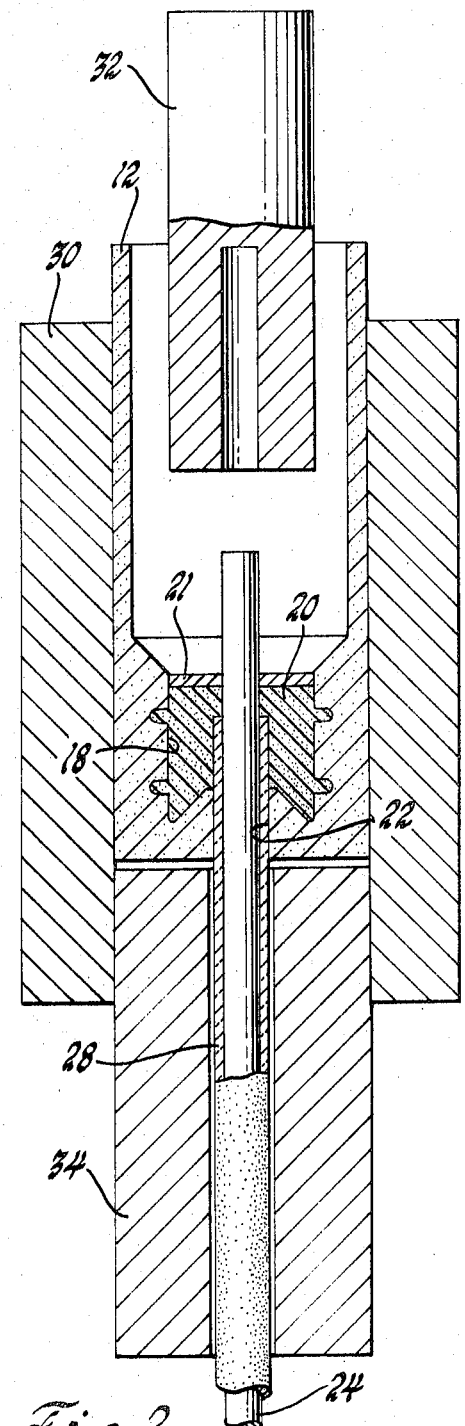
FIG. 2 is a sectioned side elevational view depicting a method of forming a seal in situ between the cell's electrodes.

In one specific example of the invention which is discussed in conjunction with FIG. 2, the well 18 of a POCO graphite cylinder 12 is filled with a mixture containing about fifteen percent by weight Fisher reagent grade lithium fluoride and 85 percent by weight yttrium oxide and placed in the die 30. The cylinder 12 has an outside diameter of 1 and ¾ inches and an inside diameter of 1 and ½ inches in the electrode region. At the bottom of the cylinder 12 the graphite is thicker and forms the well 18 having an inside diameter of 1 inch and a depth of 1 inch at its lowest points. A ⅜ inch ceramic sheath 28 is tightly fitted into the bore 22 and a ¼ inch stainless steel rod 24 tightly fitted into the sheath 28. The whole assembly is heated in an oven to 200°C. under a vacuum to completely dry the mixture. A pressure of about 3,000 psi is then applied by the rams 32 and 34 and the sample slowly heated at a rate of about 4°C./min. to about 20°C./min. to about 900°C. and held there until all ram movement stops which normally takes about 1 to 3 hours. This stand period reduces the possibility of further shrinkage in the mix and permits some of the seal material to penetrate into the surface pores of the graphite and thereby become better bonded to it. After ram movement has stopped, and while the ram pressure is held at 3,000 psi, the mixture is slowly cooled at a rate of about 4°C./min. The slow cooling tends to prevent cracking of the seal.

If a protective layer 21 is to be used (as is recommended for AlN-filled mixes used in Cl$_2$ containing cells), particles of Fisher reagent grade lithium fluoride is packed on top of the mixture and hot pressed in the manner described in the aforesaid copending application Ser. No. 309,959. In the alternative, a layer of pure lithium fluoride particles is placed atop the lithium fluoride-AlN mixture and all fused in a single operation. The precise location of the protective layer 21 will vary with the overall cell design. Though some cracking of this protective layer is possible after thermal cycling, it still serves a useful protective function in limiting exposure of the seal mixture to the reactants.

In another example, a ¼ inch thick insulating seal was made by hot-pressing a mixture comprising fifteen weight percent lithium fluoride and 85 weight percent aluminum nitride into a ½ inch annular space between a stainless steel outer tube and a graphite inner tube. The mixture was pressed at about 3,000 psi while being heated to about 900°C. The mixture was tested by exposure to a lithium fluoride-saturated lithium chloride melt at about 550°C. in an inert atmosphere. The seal did not expand to the point of damaging the steel or graphite tubes and no deterioration of the seal was observed after 12 weeks of testing. AlN-filled seals are not recommended for use in cells containing chlorine and having long mission requirements unless provision is made for additional protective layers such as described above. Lithium fluoride-AlN mixtures are considered acceptable for short mission requirement Cl$_2$-cells such as an expendable, high rate discharge primary battery used in a missle. For long mission requirement chlorine cells, one of the other fillers should be used to insure that no low melting binary salt mixture is formed.

Figure 3:
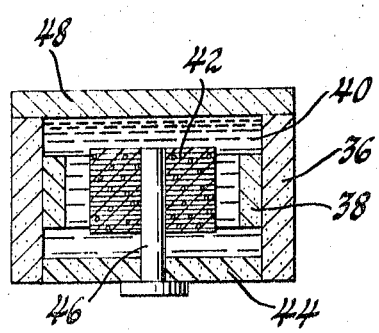
FIG. 3 is a sectioned side elevational view through a Li-S fused salt cell utilizing the seal of the present invention.

Lithium fluoride-AlN mixtures are useful with lithium sulfur cells such as shown in FIG. 3. A dense carbon cylinder 36 houses the cell. Attached to the inside of the cylinder 36 is a porous carbon cylinder 38 which is impregnated with sulfur. A LiCl-KCl electrolyte is contained in the region 40 and has a lithium matrix electrode 42, like 26 above, immersed therein. A Kovar stud 46 holds the matrix 42 in place in the cell and serves as the electrical contact to the matrix. A seal 44 comprising fifteen percent lithium fluoride and 85 percent AlN by weight is hot pressed in situ between the stud 46 and cylinder 36 before the electrodes 42 and 38 are positioned in the cell. The hot pressing is performed at about 3,500 psi and 900°C. for 2½ hours. The lithium electrode 42, sulfur electrode 38 and LiCl-KCl electrolyte are then added to the cylinder 36 and the cell sealed under vacuum by carbon bonding a cap 48 onto the cell cylinder 36. This cell is operated at about 350°C.

While we have disclosed our invention in terms of specific embodiments thereof, we do not intend to be limited thereto but rather only to the extent hereinafter set forth in the claim which follows.

We claim:

1. In a high temperature electrochemical cell, having a chamber containing electrolyte, an electrode for one of the cell's reactants contacting said electrolyte, a counterelectrode for another of the cell's reactants contacting said electrolyte and spaced apart from said electrode through said electrolyte, and an electrolyte-tight insulating seal electrically isolating said electrode from said counterelectrode and defining part of said chamber, the improvement comprising: said seal consisting essentially of at least about 15 percent by weight solid lithium fluoride and the balance a low thermal expansion filler selected from the group consisting of aluminum nitride, lanthanum oxide, yttrium oxide, calcium zirconate and lithium aluminate for mitigating the effects of lithium fluoride's thermal expansion properties and resisting the formation of salts with the cell's reactants which form low melting binary salts with lithium fluoride; and said electrolyte comprising a mixture of lithium fluoride and a salt which when fused ionically conducts the cell's current, wherein the lithium fluoride present in the electrolyte is sufficient to substantially saturate the fused salt and the fused salt has a decomposition potential less than said lithium fluoride.

* * * * *